(12) United States Patent
Gauthier et al.

(10) Patent No.: US 7,794,190 B2
(45) Date of Patent: Sep. 14, 2010

(54) ASSEMBLY FORMED BY A BASE PLATE AND A FASTENING PLUG

(75) Inventors: Alain Gauthier, Saint-Jean-de-Muzols (FR); Aurelie Bergez, Valence (FR)

(73) Assignee: Societe de Prospection et d'Inventions Techniques Spit, Bourg les Valence (FR)

( * ) Notice: Subject to any disclaimer, the term of this patent is extended or adjusted under 35 U.S.C. 154(b) by 346 days.

(21) Appl. No.: 11/908,864

(22) PCT Filed: Mar. 16, 2006

(86) PCT No.: PCT/IB2006/000590

§ 371 (c)(1),
(2), (4) Date: Sep. 17, 2007

(87) PCT Pub. No.: WO2006/097830

PCT Pub. Date: Sep. 21, 2006

(65) Prior Publication Data

US 2008/0181747 A1   Jul. 31, 2008

(30) Foreign Application Priority Data

Mar. 18, 2005 (FR) .................................. 05 02683

(51) Int. Cl.
*F15B 15/00* (2006.01)
(52) U.S. Cl. .................................................... 411/441
(58) Field of Classification Search .................. 411/440, 411/441
See application file for complete search history.

(56) References Cited

U.S. PATENT DOCUMENTS

| | | | | |
|---|---|---|---|---|
| 3,320,845 A | * | 5/1967 | Eschweiler | ................. 411/441 |
| 3,377,903 A | | 4/1968 | Korte | |
| 3,491,933 A | * | 1/1970 | Elmar et al. | ................. 227/139 |
| 4,028,986 A | * | 6/1977 | Beton | ......................... 411/440 |
| 5,125,616 A | * | 6/1992 | Rothenbuehler et al. | ....... 249/3 |
| 5,569,010 A | * | 10/1996 | Janssen et al. | .............. 411/441 |
| 5,624,220 A | * | 4/1997 | Janssen et al. | .............. 411/441 |
| 5,833,420 A | * | 11/1998 | Schmidle et al. | ............ 411/441 |
| 6,352,398 B1 | * | 3/2002 | Gonnet | ....................... 411/441 |
| 7,182,565 B2 | * | 2/2007 | Buytaert et al. | ............. 411/441 |

FOREIGN PATENT DOCUMENTS

GB     975240 A     11/1964

OTHER PUBLICATIONS

International Search Report for PCT/IB2006/000590 mailed Aug. 1, 2006.

* cited by examiner

*Primary Examiner*—Flemming Saether
(74) *Attorney, Agent, or Firm*—Lowe Hauptman Ham & Berner LLP

(57) ABSTRACT

A fastening system includes a base plate for receiving a fastening plug, the fastening plug having a shank and a head and the base plate includes a conduit for guiding and damping the shank of the plug. The base plate further includes a damping cup that is intended to house the head of the plug and the conduit following compression by the head of the plug, once the fastening plug has been driven through the base plate. The cup and the conduit are designed in such a manner that cooperation between the plug shank and the conduit causes the cup to at least partially cover the head of the plug when the plug is driven through the base plate.

4 Claims, 1 Drawing Sheet

ASSEMBLY FORMED BY A BASE PLATE AND A FASTENING PLUG

RELATED APPLICATIONS

The present application is based on International Application No. PCT/IB2006/000590 filed Mar. 16, 2006, and claims priority from French Application Number 0502683 filed Mar. 18, 2005, the disclosures of which are hereby incorporated by reference herein in their entirety.

FIELD OF THE INVENTION

The invention relates to an assembly formed, on the one hand, by a base plate for fastening a component to a substrate.

SUMMARY

Disclosed embodiments include means for receiving a fastening plug and support means intended to be applied to the component to be fastened and, on the other hand, by a fastening plug comprising a shank and a head, the means for receiving the fastening plug comprising a conduit for guiding and damping the shank of the plug and the base plate moreover including a damping cup in which the conduit, following compression by the head of the plug having a larger diameter than the conduit, and the head of the plug are intended to be housed once the plug has been driven through the base plate.

The possible components here are principally wiring ducts or moldings, i.e. narrow ducts.

Upon firing, the plug is shot towards the front. Its pointed end and part of its shank traverse the base by passage through the conduit and penetrate into the substrate. The head of the plug then comes to bear against the rear edge of the conduit, axially compressing the conduit as a result of the impact. The flattened, compressed conduit is housed in the cup, as is the nail head.

The nail head is made of metal. If a cable laid in the duct were accidentally to become exposed, the nail head disposed in the cup, generally made of plastic, could cause a short circuit.

The aim of the invention of this application is to eliminate a risk of this kind.

It therefore relates to an assembly of the type defined hereinabove, characterized in that the cup made of elastic material and the conduit are designed in such a manner that the cooperation between the plug shank and the conduit when the plug is driven through the base plate leads the cup to at least partially cover the head of the plug.

By virtue of the invention, with an electric cable extending above the cup, even an exposed cable, there is virtually no risk of a short circuit.

In the preferred embodiment of the assembly of the invention, the cup includes a skirt having an inner wall flared towards its opening.

The conduit of the base plate also preferably includes a bore having a truncated portion adapted to cooperate with the plug shank and to cause the opening rim of the cup to narrow above the plug head.

BRIEF DESCRIPTION OF THE DRAWINGS

The invention will be more readily understood with the aid of the following description of the preferred embodiment of the assembly of the invention with reference to the accompanying drawings, in which.

DETAILED DESCRIPTION OF THE DRAWINGS

Figure 1:
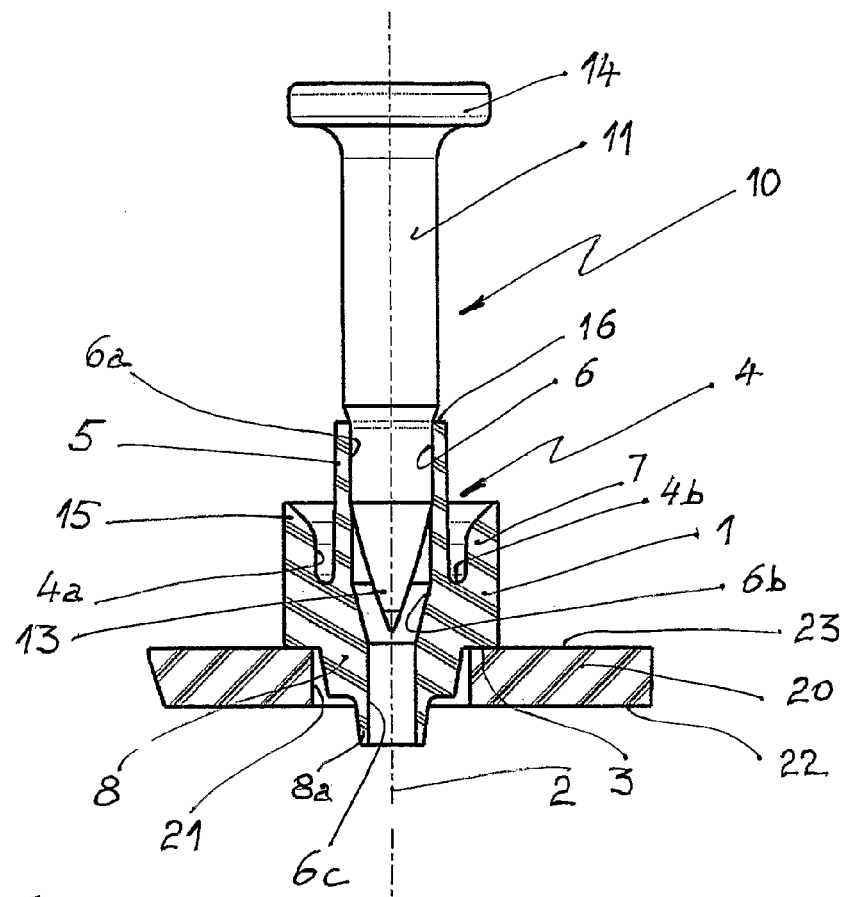
FIG. 1 is a sectional view of the fastening base plate of the assembly of the invention before fastening and bearing against a duct.

The fastening base plate of the invention allows a component to be fastened to a substrate, the fastening operation being effected with the aid of a plug-fastening device.

It will immediately be noted that the front designates the direction in which the plug is shot upon firing.

The base plate or clip comprises a support part 1 and a conduit 5 for receiving, guiding and damping a fastening plug or nail 10. The support part 1 and the conduit 5 have the same axis 2.

The support part 1 has a circular external cross section. It comprises a front bearing surface 3 perpendicular to the axis 2 and a rear damping cup or dish 4 hollowed out from the rear surface of the support part 1.

The cup 4 includes a skirt 7 having an inner wall 4a flared towards its rear opening and ending in an opening rim 15. The cup includes a base wall 4b around the conduit 5.

The conduit 5 projects towards the rear beyond the base wall 4b of the cup 4. It comprises a central bore 6 having an axis 2 for the passage of the plug 10. The bore 6 extends towards the front and traverses the support part 1. The bore 6 includes a front portion 6c having a narrowed cross section connected to the rear portion 6a by means of a truncated portion 6b.

The base plate 1 includes at the front of the bearing surface 3 a damping block 8 extended at the front by a central locating pin 8a. The portion 6c of the bore 6 of the conduit 5 having a narrowed cross section extends in the block and the pin.

The plug 10 comprises a shank 11 having an axis 2 including at the front a pointed free drilling end 13 and extended at the rear by a head 14. The cross section of the shank 11 is substantially equal to that of the enlarged rear portion 6a of the bore 6. On the other hand, the cross section of the head 14 is greater than that of the conduit 5.

The base plate is made of elastic, compressible material so that the conduit 5 can be compressed by the impact of the head 14 of the plug upon firing and thus damps the plug 10.

The base plate is intended to be rigidly connected to the end of the plug guide of a plug-fastening device by introducing the skirt 7 into the end of the plug guide.

Following the description of the structure and function of the base plate, the operation for fastening a component, in this case a duct 20, to a substrate 30 (in this case a ceiling) with the aid of the base plate and a fastening plug 10 will now be described. Fastening is effected with the aid of a plug-fastening device including a plug guide end or "nose" adapted to receive the skirt 7.

Figure 2:
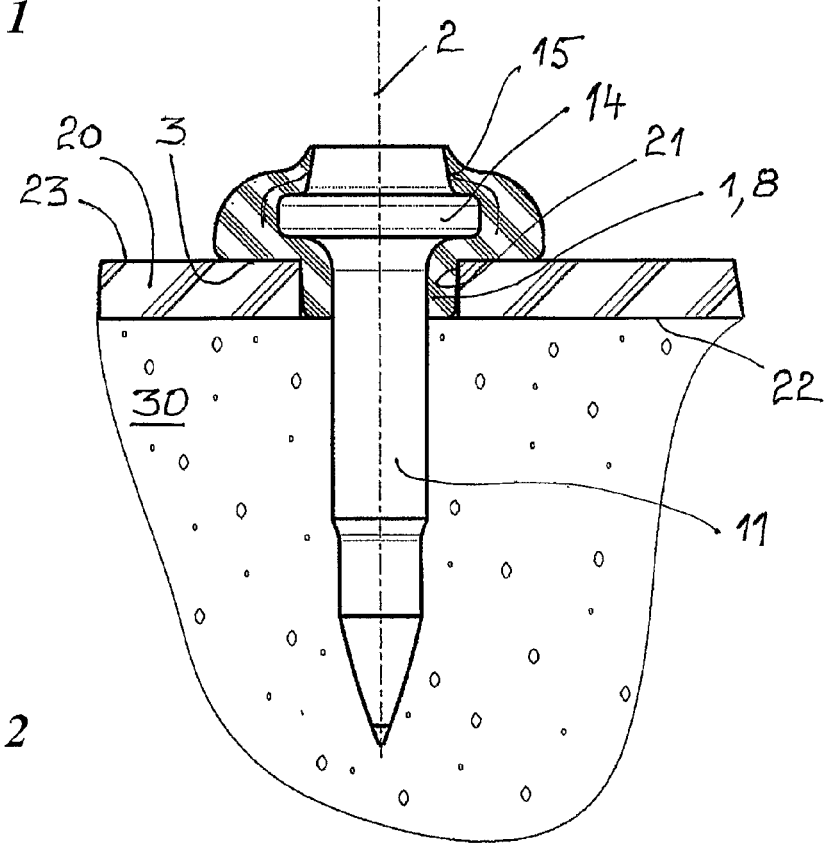
FIG. 2 is a sectional view of the base plate of FIG. 1, after the duct has been fastened to a substrate material.

The duct 20 comprises a plate including a front surface 22 intended to be attached to the substrate 30, a rear surface 23 and a plurality of through holes 21 having a cylindrical shape and an axis 2. Only one of these holes 21 is shown in FIGS. 1 and 2. The two front 22 and rear 23 surfaces are parallel to one another and perpendicular to the axes 2 of the holes 21 in the duct 20.

1. Positioning of the Base Plate

Once the base plate and the end of the plug guide have been rigidly connected together, the base plate is positioned at right angles with a hole 21 in the duct 20 by introducing the block 8 and the pin 8a into the hole 21. The base plate is brought to bear against the duct 20 by attaching the front bearing surface 3 to the rear surface 23 of the duct 20. In this position, the large base of the block 8 having a cross section substantially smaller than that of the hole 21 cooperates with the edge of the rear inlet opening of the hole 21 in order to position the base plate laterally in such a manner that the axis of the base plate and the axis of the hole 21 substantially coincide. The pin 8a moreover projects slightly towards the front beyond the hole 21. As a result of the truncated shape of the block 8, an empty space remains inside the hole 21, not occupied by the block 8 and intended to receive the compressed pin 8a and moreover part of the support portion I and part of the conduit 5, as will, be described hereinafter. The front end of the pin 8a is then brought to bear against the ceiling 30, the axes 2 in this case extending substantially vertically and the front the base plate being directed upwards.

2. Fastening the Base Plate to the Substrate

In order to fasten the base plate to the substrate 30, a fastening plug 10 is fired with the aid of the device.

Upon firing, the plug 10 is shot towards the front. Its front end 13 and part of the shank 11 traverse the base plate and penetrate into the substrate 30. The head then comes to bear against the rear edge 16 of the conduit 5, compressing it axially. As a result of, on the one hand, of the shape of the bore 6 and the shape of the shank 11 of the plug 10 and, on the other hand, the shapes of the cup 4 and the conduit 5, the driving of the plug through the base plate and the cooperation between the pointed end 13 of the shank 11 and the truncated ramp 6b of the bore 6 lead the opening rim 15 of the skirt 7 of the elastic cup 4 to narrow above the plug head 14, the axially flattened conduit 5 first being housed in the cup 4 and slightly also in the hole 21, as is also part of the support portion 1 of the base plate. In other words, the cup 4 at least partially covers the plug head 14 by means of its opening rim 15.

The duct 20 then bears at the front against the ceiling 30 and at the rear against the bearing surface 3 of the base plate. In other words, the front 22 and rear 23 surfaces of the duct 20 are attached respectively to the ceiling 30 and to the bearing surface 3 of the base plate. Once the plug 10 has been fastened in the substrate 30, the duct 20 is then held fixedly against the substrate 30 by the base plate.

The invention claimed is:

1. A fastening system, comprising:
    a fastening plug having a shank and a head having a first diameter;
    a base plate configured to receive the fastening plug for fastening a component to a substrate, the base plate including:
        a damping cup having a front opening, a rear opening, and a base wall, the damping cup being made of an elastic material and includes a skirt extending from the base wall and having an inner wall flared towards the rear opening and ending in an opening rim; and
        a conduit projecting from a base of the damping cup beyond the base wall of the damping cup, the conduit comprising a central bore having an axis configured to receive the fastening plug, the conduit having a diameter smaller than the diameter of the head of the fastening plug;
    wherein the damping cup is configured to house the conduit and the head of the plug following compression by the head of the plug, once the plug has been driven through the base plate; and
    wherein the first diameter of the head of the fastening plus is larger than the flared inner wall so that the flared inner wall ending in the opening ring is adapted to at least partially cover a top of the head of the fastening the fastening plug is driven through the base plate.

2. The fastening system according to claim 1, in which the central bore has a truncated portion configured to cooperate with the plug shank and to cause the opening rim of the cup to narrow above the plug head.

3. The fastening system according to claim 2, in which the truncated portion of the central bore of the conduit connects a front bore portion having a narrowed cross section and a rear bore portion.

4. A fastening system, comprising:
    a fastening plug having a shank and a head having a first diameter;
    a base plate configured to receive the fastening plug for fastening a component to a substrate, the base plate including:
        a damping cup having a front opening, a rear opening, and a base wall, the damping cup being made of an elastic material and includes a skirt extending from the base wall of the damping cup and having an inner wall flared towards the rear opening and ending in an opening rim; and
        a conduit, the conduit comprising a central bore having an axis configured to receive the fastening plug, the conduit having a diameter smaller than the diameter of the head of the fastening plug;
    wherein the first diameter of the head of the fastening plug is larger than the flared inner wall so that the flared inner wall ending in the opening ring is adapted to at least partially cover a top of the head of a fastening plug when the fastening plug is driven through the base plate.

* * * * *